United States Patent [19]

Lane et al.

[11] Patent Number: 4,664,366
[45] Date of Patent: May 12, 1987

[54] FIXTURE ARRANGEMENT FOR MACHINE TOOL WORK TABLES

[75] Inventors: Darryl Lane, Great Falls, Mont.; B. G. Barr, Lawrence, Kans.; Mike Dutton, Holton, Kans.; Mike Frain, Shawnee, Kans.; Simon Frechette; Keith Hummel, both of Topeka, Kans.; John Majerle, Prairie Village, Kans.; Joseph Majerle, Olathe, Kans.; Steve Rogers, Louisburg, Kans.; Mark Unger, Manhattan, Kans.; Robert Umholtz, Lawrence, Kans.

[73] Assignee: University of Kansas Center for Research, Lawrence, Kans.

[21] Appl. No.: 852,565

[22] Filed: Apr. 16, 1986

[51] Int. Cl.⁴ ............................................. B23Q 1/00
[52] U.S. Cl. .................................. 269/303; 269/309; 269/900
[58] Field of Search ................... 269/74, 77, 309, 310, 269/303, 315, 900

[56] References Cited

U.S. PATENT DOCUMENTS

| 2,621,807 | 12/1952 | Rendich | 269/900 |
| 3,942,780 | 3/1976 | Clement | 269/900 |
| 4,577,847 | 3/1986 | Schedwin | 269/309 |

Primary Examiner—Robert C. Watson
Attorney, Agent, or Firm—Kokjer, Kircher, Bradley et al.

[57] ABSTRACT

A fixture for establishing stop surfaces against which a workpiece can be held to accurately locate it during robotic machine tool operations. The fixture includes a table surface having frusto-conical openings arranged in a preselected pattern to receive locator pins. Each locator pin has a frusto-conical base which automatically centers itself in the opening so that a robotic machine can insert the pins without having to first precisely align them with the openings. Each locator pin is locked in its opening by a releaseable slide mechanism which acts against the pin on opposite sides by wedging action to securely hold the pin down on the table.

19 Claims, 6 Drawing Figures

FIXTURE ARRANGEMENT FOR MACHINE TOOL WORK TABLES

BACKGROUND OF THE INVENTION

This invention relates in general to the field of machine tools and deals more particularly with a fixture which is used to accurately position a workpiece during machining operations and which is specially constructed to be set up by a robotic machine.

Machine tools such as milling machines, drilling machines and boring machines typically include a work table on which the workpieces are held while they are being machined. In order for the machining operation to be carried out accurately, it is necessary for the workpiece to be positioned precisely on the work table relative to the tool. In the past, various types of jigs and other fixtures have been used to provide stop surfaces against which the workpiece can be held to locate it in the proper position.

One type of fixture that has been used includes stop pins and a table having holes for receiving the pins at various locations, as shown in U.S. Pat. No. 3,049,345 to McFerren. By placing the pins in different holes, stop surfaces can be established for properly locating workpieces having various sizes and shapes. Although this type of fixture is generally satisfactory in many types of machining operations, it is subject to a number of problems. In order to position the work accurately, the pins must fit closely in the receiving holes, and this requires close tolerances in the pins and the holes. In addition, the pins must be precisely aligned with the holes in order to enter them. While human operators do not have great difficulty in inserting the pins, the robotic machines are difficult to program accurately enough to permit the robot to precisely align the pins with the holes. Consequently, robotic machines are not able to set up the fixture for machining operations, and this drawback has inhibited advances in the field of robotically operated machinery.

SUMMARY OF THE INVENTION

The present invention is directed to an improved fixture which is specially constructed so that it can be easily and accurately set up by a robotic machine. To our knowledge, there has not been available in the past any machine tool fixtures which can be easily set up by a robot.

In accordance with the invention, a fixture table is provided with a series of openings which are arranged in a preselected pattern such as in a grid of mutually perpendicular rows and columns. The openings receive locator pins which can be inserted in the openings in a selected arrangement that establishes stop surfaces against which a workpiece can be held during machining operations. When a different production part is to be machined, the pins can be rearranged as desired to properly locate the new part with respect to the tool which is used to machine it.

It is a particularly important feature of the invention that the locator pins have tapered bases and the holes are similarly tapered so that the tapered surfaces of the bases and holes interact to automatically center the locator pins in the holes. Consequently, the pins can be fitted in the holes without requiring them to first be precisely aligned and then inserted into the holes. This feature makes the fixture especially well suited for robotics systems because it is necessary only for the robot to come close to aligning the pin with the opening, and the cooperating tapered surfaces then act against one another to assure that the pin is accurately centered in its hole.

Another feature of considerable importance is the conical shape of each locator pin base and each opening in the fixture table. Although other tapered shapes such as pyramids and truncated pyramids can be used, frustoconical surfaces are preferred on the locator pins and openings because they do not require that the pins be in any particular rotative position in order to properly fit in the openings.

The fixture of the present invention also includes a unique mechanism for locking the locator pins in place in the holes. Each pin has a button with a beveled surface on the lower end of its shank, and the fixture is equipped with slide devices which engage opposite sides of each pin to hold it rigidly in place in the hole which receives it. The slides carry spring loaded pivot blocks having beveled surfaces that act in wedging fashion against the beveled surfaces on the locator pins. The wedging force applied to opposite sides of each pin securely holds it down in the opening while the part is being positioned and/or machined. When it is desired for the pin to be removed from its opening, the slides can be quickly and easily released by power cylinders or other machinery.

By virtue of the mating conical surfaces of the pins and holes, a robot can easily set up the fixture for accurate machining operations. At the same time, the locking mechanism which holds the pins in place in their openings is well suited for automatic operation since it can be locked and released simply by back and forth sliding movement.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
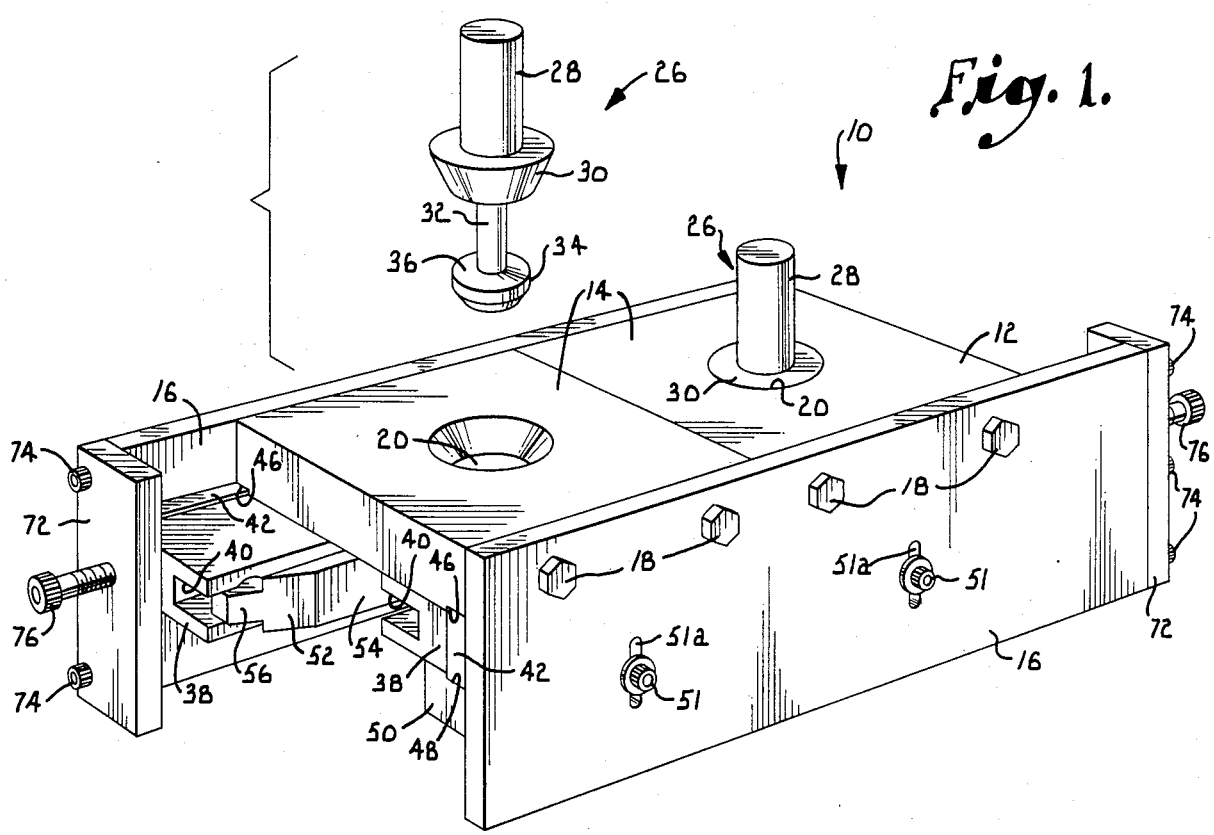
FIG. 1 is a perspective view of one portion of a fixture constructed according to a preferred embodiment of the present invention.
Figure 2:
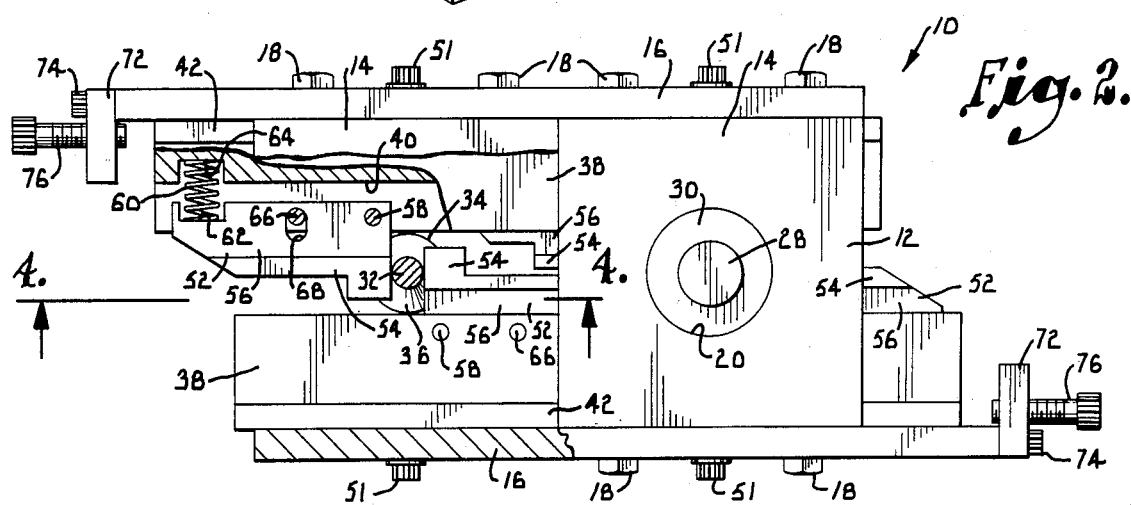
FIG. 2 is a top plan view of the fixture shown in FIG. 1, with portions broken away for purposes of illustration.
Figure 3:
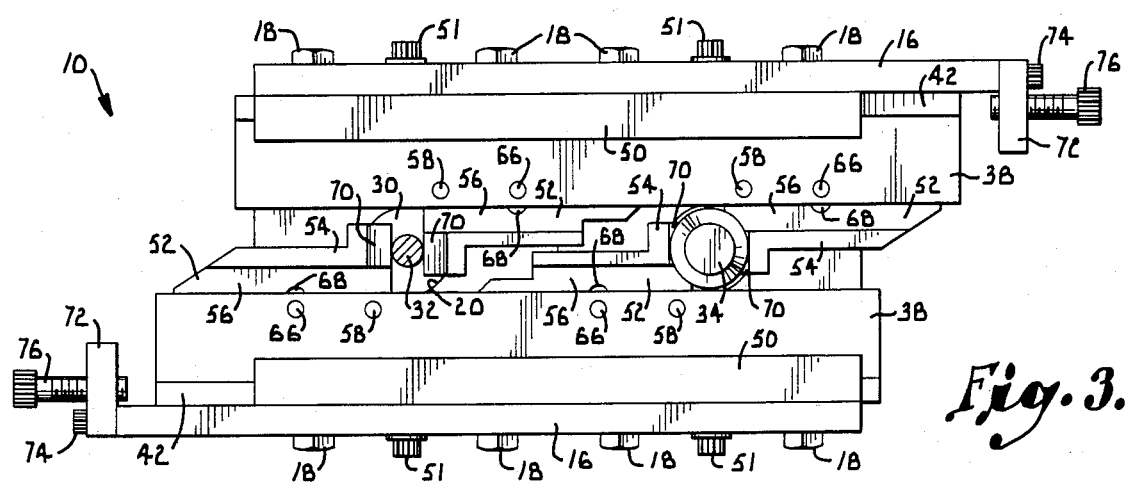
FIG. 3 is a bottom plan view of the fixture, with the shank of one of the locator pins shown in cross section for purposes of illustration.

Referring now to the drawings in more detail and initially to FIGS. 1-3, numeral 10 generally designates one portion of a fixture constructed in accordance with the present invention. The components of the fixture can be constructed of steel, aluminum or another suitable substance. The fixture 10 has a flat table surface 12 formed by a pair of rigid plates 14 located edge to edge.

Plates 14 are secured to parallel side plates 16 by machine screws 18 or other suitable fasteners.

Figure 4:
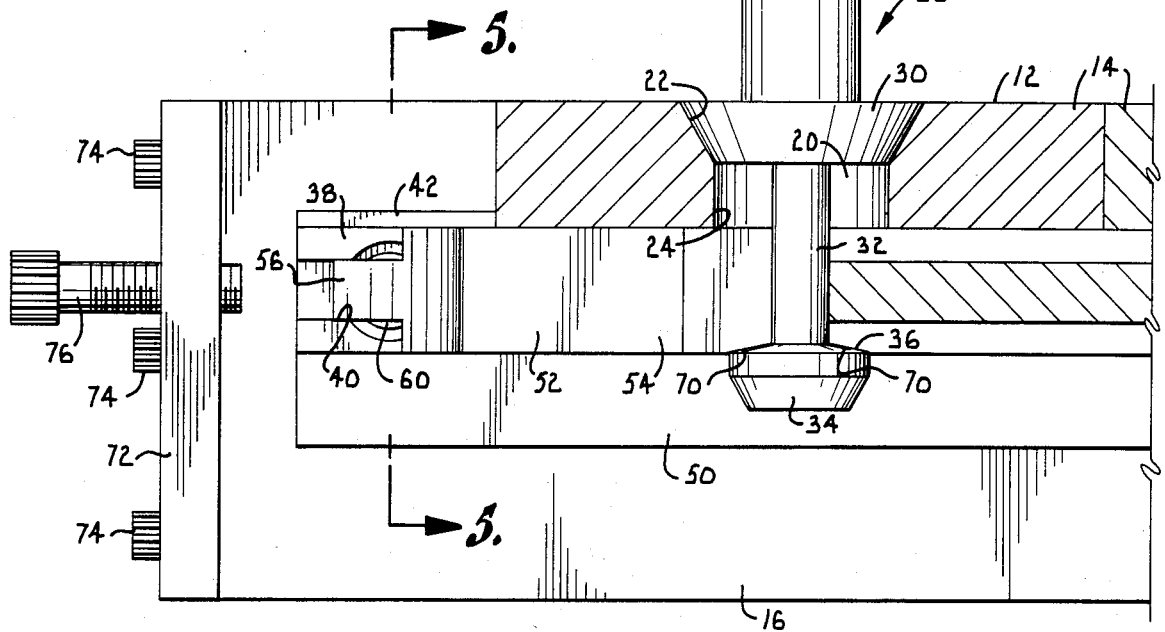
FIG. 4 is a fragmentary sectional view on an enlarged scale taken generally along line 4—4 of FIG. 2 in the direction of the arrows.

Each plate 14 is provided in its center with an opening 20. As best shown in FIG. 4, each opening 20 has a frusto-conical portion 22 which extends into the table surface 12 and tapers from top to bottom. A cylindrical passage 24 extends from the bottom of each conical portion 22 through the bottom portion of the plate 14.

Figure 6:
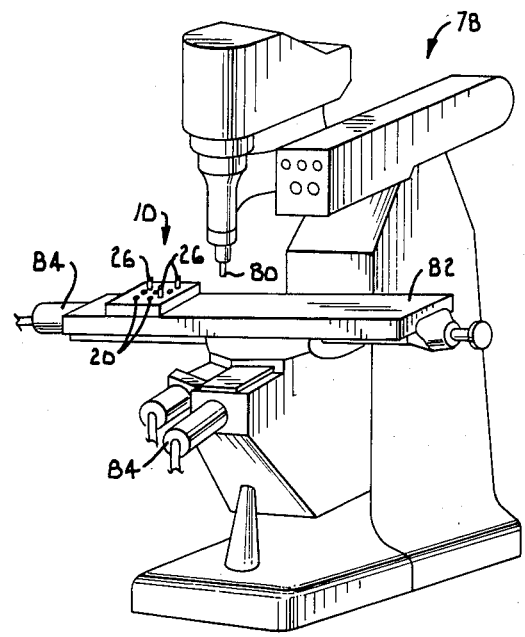
FIG. 6 is a perspective view showing the fixture of the present invention installed on a milling machine.

Although only two plates 14 and openings 20 are shown in the drawings for purposes of simplicity and clarity, it is to be understood that the fixture 10 will ordinarily be provided with a relatively large number of plates 14, each having one opening 20, and that the plates will be arranged to locate the openings 20 in a preselected pattern such as the mutually perpendicular rows and columns of openings 20 shown in FIG. 6. In the alternative, the openings 20 may be arranged in groups each having a center opening and a plurality of additional openings arranged equidistantly in a rotational pattern about the center opening. Other patterns of the openings are also possible, and it is to be understood that the present invention does not require any particular arrangement of the openings 20.

The fixture 10 includes a plurality of locator pins 26 which are identical to one another. Each locator pin 26 includes a cylindrical pin element 28 extending from the top surface of a frusto-conical base 30. The base 30 has the same size and shape as the frusto-conical portion 22 of each opening 20, and each base 30 can thus be closely fitted in each of the openings in the table surface 12. Extending downwardly from the bottom of each base 30 is a cylindrical shank 32 which carries a button 34 on its lower end. As best shown in FIG. 4, each button 34 has a beveled upper surface 36 which inclines downwardly at a slight angle as it extends outwardly away from the shank 32. The diameter of each button 34 is less than the diameter of the passage 24 of each opening 20 so that the buttons can be freely passed through the passages. When one of the locator pins 26 is positioned in one of the openings 20 as shown in FIG. 4, shank 32 extends through passage 24, and button 34 is located well below the bottom surface of the table 12.

Figure 5:
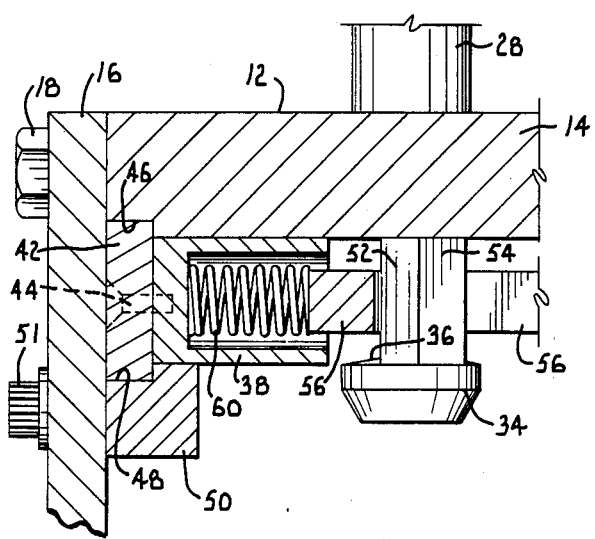
FIG. 5 is a fragmentary sectional view taken generally along line 5—5 of FIG. 4 in the direction of the arrows.

The fixture 10 includes a releaseable lock mechanism which acts to lock the locator pins 26 in place in the openings 20. The lock mechanism includes a pair of elongate sliding blocks 38 each having a rectangular groove 40 in its inwardly facing side. The bars 38 are located adjacent to the opposite side plates 16 and immediately beneath the table 12. As best shown in FIG. 5, each of the sliding bars 38 has a backing plate 42 which is secured to the back of the bar by a plurality of counter sunk screws 44. The top edge of each back plate 42 fits closely in a groove 46 formed in the underside of table 12 adjacent to the side plate 16. The lower edge of each back plate 42 fits closely in a groove 48 which is formed in the upper surface of a support block 50 which is secured to the side plate 16 by screws 51 (see FIG. 1). The screws 51 extend through vertical slots 51a in plate 16 in order to permit the support block 50 to be adjusted up and down.

In this manner, each bar 38 is supported for horizontal sliding movement back and forth along the adjacent side plate 16. Each back plate 42 slides in the grooves 46 and 48 and fits closely therein in order to maintain the slide bars 38 in the proper alignment.

The two sliding bars 38 are spaced apart from one another on opposite sides of the openings 20, and each slide carries a pair of pivot blocks 52. Each pivot block 52 has a body portion 54 which is wider than groove 40. A tongue 56 extends from the body 54 of each pivot block 52 and fits closely in the groove 40 of the corresponding block 38. As best shown in FIG. 2, a vertical pivot pin 58 pins each tongue to its bar 38 at a location within groove 40. Each pivot block is urged to pivot in one direction about its pin 58 by a relatively stiff compression spring 60. One end of spring 60 fits in a recess 62 formed in tongue 56, and the opposite end of the spring is received in a pocket 64 formed in bar 38 at the base of groove 40. The pivotal movement of each block 52 is limited by a vertical pin 66 which extends across groove 40 and through a slot 68 formed in tongue 56.

The biasing force applied to each block 52 by spring 60 normally maintains the pivot block in the position shown in FIG. 2, with pin 66 located against one end of slot 68. However, each pivot block 52 can be pivoted about pin 58 in opposition to the force of spring 60 to a limited extent in order to accommodate irregularities and prevent the mechanism from jamming. Pivotal movement of each block 52 in a direction opposite the direction it is urged by spring 60 is limited by engagement of pin 66 with the opposite end of slot 68.

As best shown in FIG. 4, the leading end of each pivot block 52 is provided on its under side with a beveled surface 70 which is inclined at the same angle as the beveled surface 36 of each button 34. When the lock mechanism is engaged, surfaces 70 interact in wedging fashion with surfaces 36 in order to securely hold the locator pins 26 in place, as will be explained more fully.

Each of the sliding bars 38 carries two of the pivot blocks 52. For example, the bar 38 which appears near the lower end as viewed in FIG. 3 carries the two spaced apart pivot blocks 52 which have the beveled surfaces 70 on their right ends which are the leading ends when the bar 38 is slid to the right toward its locking position. The other slide bar 38 carries the other two pivot blocks 52, and these pivot blocks have the beveled surfaces 70 on their left ends which are the leading ends when moved to the left toward the locking position as viewed in FIG. 3. The lower bar 38 moves from left to right to engage the two locator pins 26 and from right to left to release the locator pins. The upper bar 38 moves in opposite directions between the engaged and released positions; i.e. from right to left toward the engaged position and from left to right toward the release position. When both bars 38 are in the engaged position shown in FIG. 3, each locator pin 26 is engaged on opposite sides by one of the pivot blocks 52 located on each of the slide bars 38. The pivot blocks clamp the shank 32 between them.

One end of each side plate 16 is provided with a small end plate 72 which may be secured to the side plate by screws 74. [A larger screw 76 is threaded through each end plate 72. Each of the screws 76 may be extended in threaded fashion until it engages the end of the adjacent back plate 42, thereby locking the corresponding bar 38 in the engaged position to hold it against the locator pin 26.] In order to release the bar 38 and permit it to be moved to the release position, the screw 76 must first be backed off.

The fixture 10 is normally used to properly locate a workpiece that is to be machined by automatic machinery such as the milling machine generally designated by numeral 78 in FIG. 6. The machine 78 includes a suitable tool 80 for performing the machining and a horizontal support table 82 for supporting the workpieces that are to be machined. The fixture 10 may be secured to the table 82 in any suitable manner and at a precisely known position on the table. Power cylinders 84 serve to adjust the support table 82 in the "X", "Y" and "Z" directions.

It is contemplated that the fixture 10 will be used primarily in connection with machining operations carried out automatically under computer control and with a robotic machine (not shown) acting to set up the fixture 10 and to position the parts which are to be machined. In setting up the fixture, the robotic machine is instructed by the computer to position the locator pins 26 in selected openings 20 such that the pin elements 28 project vertically above the table surface 12 to establish stop surfaces against which the workpieces can be positioned and held to locate them properly relative to the tool 80 which is to carry out the machining operation. For example, three of the locator pins 26 will normally be positioned in selected openings 20, as shown in FIG. 6, since three points in a plane are sufficient to define the location of a workpiece. Because the location of the fixture 10 on table 82 is precisely known and because the location of each opening which receives one of the locator pins 26 is precisely known, the location of the workpiece relative to tool 80 is precisely known when the workpiece is held against the pins 26. Consequently, the machining operation can be accurately carried out with the workpiece accurately positioned by the fixture 10.

It is a particularly important feature of the invention that each locator pin 26 can be fitted in the selected opening 20 without first requiring that the pin be precisely outlined with and centered on the opening. If the pin is misaligned somewhat relative to the opening when it is fitted therein, the conical surface of base 30 interacts with the mating surface of the conical portion 22 of the opening in order to automatically center the pin 26 in the opening 20. Therefore, the fixture 10 is particularly well suited for use by robotic machines which have difficulty in precisely aligning pins with openings but which can at least come close to alignment (which is all that is necessary). When the locator pins 26 have been fitted in the selected openings 20, the upper surfaces of the bases 30 are flush with and form part of the upper surface of the table 12, and the pin elements 28 extend above and are perpendicular to the table surface at precise locations.

When the locator pins 26 are being inserted in their openings 20, the slide bars 38 are in their release positions to avoid interfering with insertion of the pins. After the pins have been fitted in the openings, the slide bars 38 are moved to the engaged positions in which a pair of opposing pivot blocks 52 engage opposite sides of each shank 32, with the beveled surfaces 70 wedging against surface 36 of each button 34 in order to assure that the locator pin will be securely held down and retained in its opening.

The locking mechanism thus engages each locator pin on opposite sides in order to hold it firmly in place and to assure that it is not skewed or otherwise improperly positioned. The ability of each pivot block 52 to pivot against the force applied by spring 60 prevents opposing blocks from becoming jammed. As best shown in FIGS. 4 and 5, the body portion 54 of each pivot block is tightly wedged between the underside of table 12 and the button 34 in the engaged position of the lock mechanism, thereby securely holding the locator pin 26 down and assuring that base 30 remains properly seated in the conical portion 22 of its opening 20.

Each locator pin 26 can be released by sliding bars 36 to their release positions in which the pivot blocks 52 are released from the locator pins. Then, the locator pins 26 can be easily removed by the robotic machine from the openings 20 and repositioned in other selected openings in order to accommodate a different part which is to be machined.

It should be understood that each of the slide bars 38 can serve virtually any number of openings 20. It is contemplated that each row of openings 20 will have a pair of the slide bars 38, and that each of the slide bars in each pair will be provided with pivot blocks 52 equal in number to the number of openings 20 in the row. It is also contemplated that the slide bars 38 will be moved between the engaged and release positions by power cylinders or other automatic equipment. The fact that the slide bars 38 move linearly between the engaged and release positions makes them particularly suitable for operation by power cylinders and other automatic equipment. Consequently, the locking mechanism shown in the drawings is preferred for holding the locator pins in place, although other types of releaseable mechanisms can be used for this purpose.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A machine fixture for locating a workpiece relative to a tool, said fixture comprising:
    a rigid table having a plurality of tapered openings therein arranged in a grid pattern and each being tapered as it extends into the table;
    a plurality of locator pins each having a substantially cylindrical pin element and a tapered base portion which substantially conforms in size and shape to each opening to permit insertion of the pins in selected openings with the pin elements projecting upwardly from the table to establish stop surfaces against which the workpiece can be held, said tapered base portions of the pins being coaxial with the corresponding pin elements and cooperating with the tapered openings to center each pin element in the opening in which it is fitted in all rotational positions of the pin; and
    releaseable means for holding each pin in the opening in which the pin is fitted.

2. The fixture of claim 1, wherein each opening has a generally frusto-conical shape and said tapered base portion of each pin has a generally frusto-conical shape.

3. The fixture of claim 1, wherein said releaseable means for each pin comprises a slide member mounted on said table for movement between an engaged position wherein the slide member engages the pin in a manner to retain it in the opening in which it is inserted, and a release position wherein the slide member is released from the pin to permit removal of same from the opening.

4. The fixture of claim 3, including a beveled surface on each pin and a beveled surface on said slide member engaging said beveled surface of the pin in the engaged position of the slide member in a manner to apply a wedging force to the pin for retaining same in the opening in which it is inserted.

5. The fixture of claim 3, wherein said releaseable means for each pin comprises a second slide member mounted on said table for movement between an engaged position wherein the second slide member engages the pin in a manner to assist the first mentioned slide member in retaining the pin in the opening in which it is inserted, and a release position wherein the second slide member is released from the pin to permit removal of same from the opening, said first and second slide members engaging the pin on opposite sides of the latter in the engaged positions of the slide members.

6. The fixture of claim 5, including a beveled surface on each pin and a beveled surface on each slide member engaging said beveled surface of the pin in the engaged position of the slide member in a manner to apply wedging action to the pin for retaining same in the opening in which it is inserted.

7. The fixture of claim 6, wherein said first and second slide members are mounted on the table for linear sliding motion between the engaged and release positions, said first and second slide members moving in opposite directions toward their engaged positions.

8. The fixture of claim 7, including:
a pivot block on each slide member mounted thereon for pivotal movement about a pivot axis oriented substantially parallel to the axis of the pin when same is inserted in an opening, said blocks presenting said beveled surfaces of the slide members; and
yieldable means for urging each block in a preselected pivotal direction about its pivot axis.

9. The fixture of claim 8, wherein:
each opening extends through said table; and
each locator pin has a shank projecting below the table when the pin is fitted in an opening, said beveled surface of each pin being located on said shank thereof.

10. The fixture of claim 3, wherein said slide member is mounted for linear sliding movement between the engaged and release positions and including:
a pivot block on said slide member mounted thereon for pivotal movement about a pivot axis oriented substantially parallel to the axis of the pin when same is inserted in an opening, said block engaging the pin in the engaged position of the slide; and
yieldable means for biasing said block in a preselected direction about said pivot axis.

11. The fixture of claim 10, including:
a beveled surface on each pin; and
a beveled surface on said block acting to wedge against said beveled surface of the pin in the engaged position of said slide member, thereby retaining said tapered portion of the pin by wedging action in the opening in which it is fitted.

12. The fixture of claim 11, wherein:
each opening extends through said table; and
each locator pin includes a shank extending below the table out of the opening in which the pin is fitted, said beveled surface of each pin being presented on the shank thereof.

13. The fixture of claim 12, wherein each shank carries an enlarged button thereon which presents said beveled surface of the locator pin.

14. The fixture of claim 1, wherein each locator pin includes:
a shank extending from said base and projecting below the table when the base f fitted in an opening; and
a button portion on said shank at a location below the table when the base is fitted in an opening, said button portion being larger than said shank and being engaged by said releaseable means in a manner to hold base in the opening.

15. A machine fixture for use by a robotic machine to locate a workpiece relative to a machine tool, said fixture comprising:
a generally flat table surface having a plurality of openings therein arranged in a preselected grid pattern, each opening having a frusto-conical portion thereof which tapers as it extends into the table surface;
a plurality of locator pins each having a frusto-conical base portion and a substantially cylindrical pin element coaxial with the base portion, said base portions substantially conforming in size and shape to said frusto-conical portions of the openings and said pin elements extending from the base portions of the corresponding locator pins, whereby said locator pins can be inserted in selected openings by the robotic machine with said base portions locating themselves closely in said frusto-conical portions of the selected openings to center the pins in the openings and with said pin elements projecting from the table surface and being centered in the openings at all rotative positions of the pins to establish stop surfaces against which the workpiece can be held; and
releaseable means for retaining each locator pin in the opening into which it is inserted.

16. The fixture of claim 15, wherein:
each locator pin includes a shank portion projecting from the base portion thereof in a direction opposite the pin element; and
said releaseable means for each locator pin is engageable with said shank portion of the pin to retain the locator pin in the opening into which it is inserted.

17. The fixture of claim 16, wherein said releaseable means for each locator pin comprises a pair of slide members supported on the table for sliding movement in opposition to one another between engaged positions wherein the slide members engage opposite sides of the shank portion to retain the locator pin in the opening, and release positions wherein the slide members are released from the shank portion of the pin.

18. A machine fixture for locating a workpiece relative to a machine tool, said fixture comprising:
a rigid table having a plurality of openings extending therethrough and arranged in a preselected grid pattern, each opening having a tapered portion which tapers from top to bottom;
a plurality of locator pins each having a tapered base which substantially conforms in size and shape to said tapered portions of the openings, each locator pin having a pin element projecting from the table when the base portion is inserted in an opening, whereby said pin elements establish rigid stop surfaces for locating the workpiece when said pins are inserted into selected openings and centered therein by the fit of said base portions in said tapered portions of the selected openings;

a shank portion of each locator pin projecting below the table and out of the opening n which the pin is inserted; and releaseable means for engaging each shank at a location below the table in a manner to retain the corresponding locator pin in the opening into which is is inserted, said releaseable means for each locator pin comprising a pair of slide members supported on the table for sliding movement in opposition to one another between engaged positions wherein the slide members engage opposite sides of the shank portion to retain the locator pin in the opening, and release positions wherein the slide members are released from the shank portion of the pin.

19. The fixture of claim 18, including means on each slide member for applying a wedging force to the shank portion of the locator pin for retaining the pin in the opening into which it is inserted.

* * * * *